United States Patent [19]

Kneer

[11] Patent Number: 5,066,392
[45] Date of Patent: Nov. 19, 1991

[54] APPARATUS FOR MICROBIOLOGICAL DECOMPOSITION OF ORGANIC WASTE

[76] Inventor: Franz X. Kneer, Am Honigbaum 6, D-6345 Eschenburg-Eibelshausen, Fed. Rep. of Germany

[21] Appl. No.: 392,341

[22] Filed: Aug. 11, 1989

[30] Foreign Application Priority Data

Aug. 11, 1988 [DE] Fed. Rep. of Germany ....... 3827288
Dec. 12, 1988 [DE] Fed. Rep. of Germany ....... 3841804

[51] Int. Cl.$^5$ ............................................. C02F 11/06
[52] U.S. Cl. ................................. 210/96.1; 210/151; 210/200; 210/219; 210/253; 422/232
[58] Field of Search ............... 210/96.1, 614, 200–202, 210/205, 208, 209, 218, 219, 150, 151, 253; 422/232, 233

[56] References Cited

U.S. PATENT DOCUMENTS

| | | | |
|---|---|---|---|
| 2,680,069 | 10/1950 | Eweson | 71/9 |
| 2,992,986 | 7/1961 | Ingram | 210/151 X |
| 4,036,754 | 7/1977 | Peasley | 210/151 X |
| 4,352,738 | 10/1982 | Blay et al. | 210/614 X |
| 4,582,514 | 4/1986 | Kneer | 55/71 |
| 4,613,433 | 9/1986 | McKeown | 210/150 |
| 4,931,183 | 6/1990 | Klein et al. | 210/614 |
| 4,931,401 | 6/1990 | Safi | 210/150 |

FOREIGN PATENT DOCUMENTS

3322688 1/1985 Fed. Rep. of Germany .

Primary Examiner—Thomas Wyse
Attorney, Agent, or Firm—Foley & Lardner

[57] ABSTRACT

A process and apparatus for microbiological degradation of wastes and for the separation and degradation of organic impurities from waste gases. For the degradation of organic wastes, the individual charges are divided into part charges and alternately are aerated discontinuously in separate rotting vessels until the desired degree of degradation has been reached. For the degradation of impurities in waste gases, the waste gas is alternately passed discontinuously into separate filter units which contain biologically active microorganisms. The waste gases are fed to the particular absorbent until the latter is saturated. Feeding of the waste gases to that unit is then interrupted until the microorganisms colonizing the absorbent of the first filter unit has degraded the pollutants. During the pauses, the waste gas is passed through at least one further absorbent, of the same structure but independent of the first, into a second filter unit, and vice versa.

17 Claims, 5 Drawing Sheets

APPARATUS FOR MICROBIOLOGICAL DECOMPOSITION OF ORGANIC WASTE

BACKGROUND OF THE INVENTION

The invention relates to a process and apparatus for microbiological degradation of organic wastes, which are introduced batchwise into a vessel closed on all sides for the purpose of forced discontinuous aeration and, after the microbiological degradation has taken place, are mechanically discharged from the vessel.

It also relates to a process for separating organic impurities from waste gases which are forced through a biomass, surrounded by a vessel, as absorbent, wherein the impurities are at least partially degraded by metabolic processes of microorganisms colonizing the absorbent.

In the so-called Blaubeuer aeration process, the heap of organic wastes, which is to be microbiologically degraded and is preferably arranged on a perforated plate, is aerated by sucking through or blowing in air from below in surges interrupted by pauses, the pauses being of such a length that the temperature in all layers of the heap is the same and the oxygen content in the waste air does not fall below 10% by volume.

Even though it showed excellent rotting results, this discontinuous process has been replaced by continuously operating large-scale rotting processes, in which the rotting material passes continuously from top to bottom through an aeration reactor and the entire atmospheric oxygen required for the rotting process is introduced from the bottom of the aeration reactor into the latter, likewise continuously, in a counter-current process in such a way that, in the aeration reactor, different temperature and $O_2$ zones are formed, of which the zone of highest temperature is located in the upper third and the zone of lowest temperature is located in the outlet, and the zone of highest oxygen content is located at the bottom and the zone of lowest oxygen content is located in the uppermost layer within the heap in the aeration reactor. Reference is made to British Patent Specification 1,402,955.

In place of a purely aerobic microbiological degradation of the organic wastes, anaerobic microorganisms also participate in the degradation of the wastes in the last mentioned, continuously operating process, so that an optimization of the technical imitation of the natural degradation conditions occurring in nature is obtained, since in each case all microorganisms participating in the natural microbiological degradation of organic wastes are employed on a large scale.

Such a continuously operating process, however, presupposes a reliably functioning technology, which so far has not been possible to be realized in spite of many efforts. This becomes particularly critical for large units, where rotting vessels of a capacity of more than 1200 m³ are used. Even the introduction of the wastes causes difficulty, for example in the case of introduction via spinning plates, a selection of the organic wastes by gravity takes place, leading to different density conditions within the heap. Uniform aeration and hence uniform microbiological degradation can, however, be achieved only if a heap of identical density can be subjected uniformly to forced aeration over the cross-section, that is to say the same resistance over the entire cross-section; as is known, the air which is injected or extracted seeks out the route of least resistance through the heap. Similar comments apply to the discharge which must likewise take place uniformly over the entire cross-section of the heap. Irregularities in the mechanical feed and discharge thus lead to different air resistances, so that so-called air bridges result which in turn cause different temperature zones, drying-out and/or wetting of individual regions of the heap which is to be aerated in a predetermined manner. In addition, compaction zones are formed which, although they migrate in some cases through the vessel, cause considerable disturbances on discharge at the latest. As soon as the continuous operation is disturbed, the entire biology gets out of control, so that the total vessel must be emptied, which frequently leads to intolerable technical difficulties. The operating personnel also has to meet stringent requirements with respect to knowledge of the particular causes of the disturbances arising and of possibilities of overcoming them.

As is known, the collected domestic trash or garbage varies widely from day to day in its structure, with high organic contents which, as a rule, are very moist. Very frequently, the trash has a high content of paper and cardboard, quite apart from so-called ballast materials such as plastic bags and the like, which cause hard, air-impermeable layers in the vessel. The density differences due to the gravity selections during charging also leads to different air resistances, which inevitably cause irregular degradation results and hence also irregular discharge results. The entire biological degradation is thus pushed out of equilibrium. Increased air feed then leads to so-called snuffing of the biology within the heap in the vessel, and this causes caking of the heap and hence a rock-hard conglomerate—similar to "nadelflur"—which cannot be discharged either by means of chain cutters or worm-wheel cutting machines. "Nadelflur" is a conglomerate of fir needles which may form the ground of a forest and represents a layer permeable to air.

It is also known to subdivide the entire heap, which is to be continuously degraded and is located in a vessel, by means of grids and cutting tools associated with these grids into individual sections of different sizes, in order to facilitate the transport of the individual particles of the heap through the vessel. Reference is made to U.S. Pat. No. 2,680,069.

Such a subdivision of the transport of the particles of the heap leads, however, to extremely poor microbiological degradation results, since there is great interference with the activity of the microorganisms due to the multiple mechanical intervention and, in particular, the mycelium threads which are formed are torn again and again. In addition, new air bridges are continuously created, so that the air fed can escape in an uncontrolled fashion without having been able to be utilized for breathing by the microorganisms becoming active.

SUMMARY OF THE INVENTION

For the industrial imitation of the natural microbiological degradation of organic wastes, a minimum quantity of wastes must be present in the form of a heap which is in itself undisturbed. On the other hand, the engineering problems of the mechanical feeding and discharge and hence of the control of the forced aeration become much more serious with increasing volume of the heap which is to be degraded microbiologically. It is therefore an object of the invention to provide a process for microbiological degradation of organic wastes and apparatus for carrying out the process, by means of which an atmosphere well suited to the microorganisms participating in the degradation can be created more easily than previously and can be maintained for any desired operating periods.

It is also known that organic impurities contained in waste gases can be degraded by passing the waste gases through a biomass as an absorbent, the organic constituents in the waste gases being at least partially degraded by metabolic processes of the microorganisms colonizing the biomass.

As soon as the activity of the biomass has been exhausted, which is detected by measurements of the $O_2$ content of the waste air leaving the vessel, the biomass must be replaced.

It is also known, in such a process for separating gaseous impurities from waste gases from processing units in the chemical industry, by exploiting the metabolic processes of microorganisms, to pass the substrate colonized by the microorganisms in the manner of a migrating bed through a vessel closed on all sides, the substrate acting as the biomass being heavily populated by *Actinomycetes globisporus* and, for separating off waste gases polluted by halogenated impurities, being provided with an additional fungal population of the species Penicillium. Reference is made to German Offenlegungsschrift 3,322,688.

Experience has shown, however, that the waste gases to be purified are admittedly adsorbed or absorbed by the biomass and degraded more or less rapidly or slowly by the microorganisms colonizing the biomass, depending on their type, but that saturation of the biomass and of the microorganisms takes place very rapidly. After the biomass has been saturated, the waste gases then flow unpurified through the biofilter, and the microorganisms can no longer degrade the pollutants, or only partially. In both the previously known embodiments, this biological characteristic of such filters causes considerable technical difficulties.

It is therefore a further object of the invention to modify the known biofilter process and the corresponding equipment in such a way that saturation phenomena do not interfere with the degradation process.

As a result of the process according to the invention, the entire heap of organic wastes, which has been introduced batchwise and is to be degraded microbiologically, is subjected to microbiological degradation in at least two part charges, alternately aerated discontinuously, of an optimum size for the industrial imitation of the natural microbiological degradation, by the use of mechanical feed and discharge implements which, as a result of the selected size of the part charges and of the aeration and degradation process used, are capable of maintaining the desired degradation of the organic wastes in an optimum manner without disturbances for operating periods of any desired length. The vessel modules according to the invention also make it possible in a simple manner to process relatively large charges, since a further two vessel module can always be combined in each case for the degradation, so that preferably two, four or more vessel modules in each case, side by side or on top of one another in the case of two vessel modules or, in addition to the two or four vessel modules arranged side by side, two or four vessel modules placed on top. In each case four or eight, and so on, vessel modules form, together with a wall module and machine module, a vessel structure for the batchwise microbiological degradation of the organic wastes.

Owing to the selected size, the vessel modules according to the invention can be uniformly charged in a simple manner with the organic wastes which are to be degraded, in particular if these modules are designed as rectangular vessel modules, since a simple raking share can then be used as the feed implement which can be moved to and fro and also up and down, and by means of which the surface of the heap introduced into the vessel module, for example by means of a conveyor belt, can always be spread out smoothly. The resistance against the air to be introduced is thus always of the same magnitude over the entire cross-section of the heap, so that the same microbiological degradation conditions can be established in the entire heap.

The discharge turns out to be equally simple, since drag conveyors arranged above the perforated tray near to the bottom of the vessel module are sufficient for this purpose in the simplest case. Of course, so-called chain cutters are also suitable for this purpose, by means of which the degraded heap can be discharged reliably and completely at the end of the rotting period.

Since the vessel modules are surrounded by a wall module, the construction and manufacture of the vessel modules are surprisingly simple, and heat insulations, and air, water and other necessary connections can be associated with the wall module for connection with corresponding air and water connections on the vessel modules, so that maintenance and replacement of vessel modules are also greatly simplified.

This also applies to the paint-operating section of the vessel structure, since all the mechanical components and control engineering components required for operating the assembly are associated with the machine module.

Owing to the selected size, the vessel modules cannot only be easily emptied but, due to the perforated tray, they are also easy to clean, for example by means of a pressurized water jet, if this should be necessary after the discharge of the heap. In particular, with the arrangement and design according to the invention of the vessel structure, excellent microbiological degradation conditions can be produced so that, at the end of the degradation process, a humus-like product is obtained which is well tolerated by plants.

For the waste gas purification, the waste gases are fed to the absorbent until the latter is saturated; subsequently, the waste gas feed is then stopped, until the microorganisms colonizing the absorbent have degraded the pollutants. In the pauses, the waste gas is passed through at least one further absorbent, which is of similar structure but is independent of the first absorbent, and vice versa.

According to the invention, only such a quantity of waste air is in each case forced stepwise through the biomass whereby the biomass is capable of adsorbing or absorbing the pollutants. The latter can then be degraded by the microorganisms colonizing the biomass during the rest period, in which no further waste air is fed, so that the pollutants present in the waste air can be degraded almost completely by the microorganisms.

In contrast to the state of the art, the waste air which is to be purified is thus introduced into the biomass not continuously but discontinuously, interrupted by predetermined pauses. The microorganisms are therefore allowed time for the microbiological processing of the pollutants. Surprisingly, it has been found, on the basis of the tests which have been carried out, that the biomass can be utilized here for a much longer period than previously, quite apart from the fact that the filter results are considerably better. In order to nevertheless allow a continuous procedure, the biofilter according to the invention always has two or more filter units in its equipment design. As long as filter unit I is being charged, filter unit II has a rest period which has to be fixed empirically. If a plurality of filter units, for example four, are provided side by side as a function of the extent of the toxic content of the waste air, filter unit I is charged, and filter units II, III and IV have a "breather". During this rest period, the microorganisms have time to degrade the pollutants present in the waste air. The cycle of the alternating charging depends on the rate of waste air, and in particular on the composition of the waste air and the nature of the pollutants.

According to the available test results, the start of the pauses is determined as a function of the organic C content in the waste air leaving the vessel, and the end is fixed on the basis of empirically determined time values which should not be less than three minutes and should not exceed thirty minutes.

It is advantageous if the filter units are designed in a four-cornered form, since these can then be set with the inner walls against each other, so that not all the side walls of the filter units, but only the biofilter as a whole, that is to say the wall module, has to be constructed with heat insulation. This gives the further advantage that, in place of a worm wheel discharge device covering the cross-section of the entire biofilter, inexpensive and operationally reliable drag discharge systems of controllable size can be used.

Finally, in the purification of waste gases which can be degraded in only one direction or are difficult to degrade, a readily degradable gas as a solvent, for example toluene or xylene, is admixed to the waste air, so that a mixed gas is formed which leads to a high biological activity in the biomass and hence to a high degree of degradation in the case of such gases which are difficult to degrade.

BRIEF DESCRIPTION OF THE DRAWINGS

The invention is described and explained below by reference to illustrative embodiments in certain instances shown more diagrammatically in the drawing figures, in which.

DETAILED DESCRIPTION OF THE PREFERRED EMBODIMENTS

Figure 1:
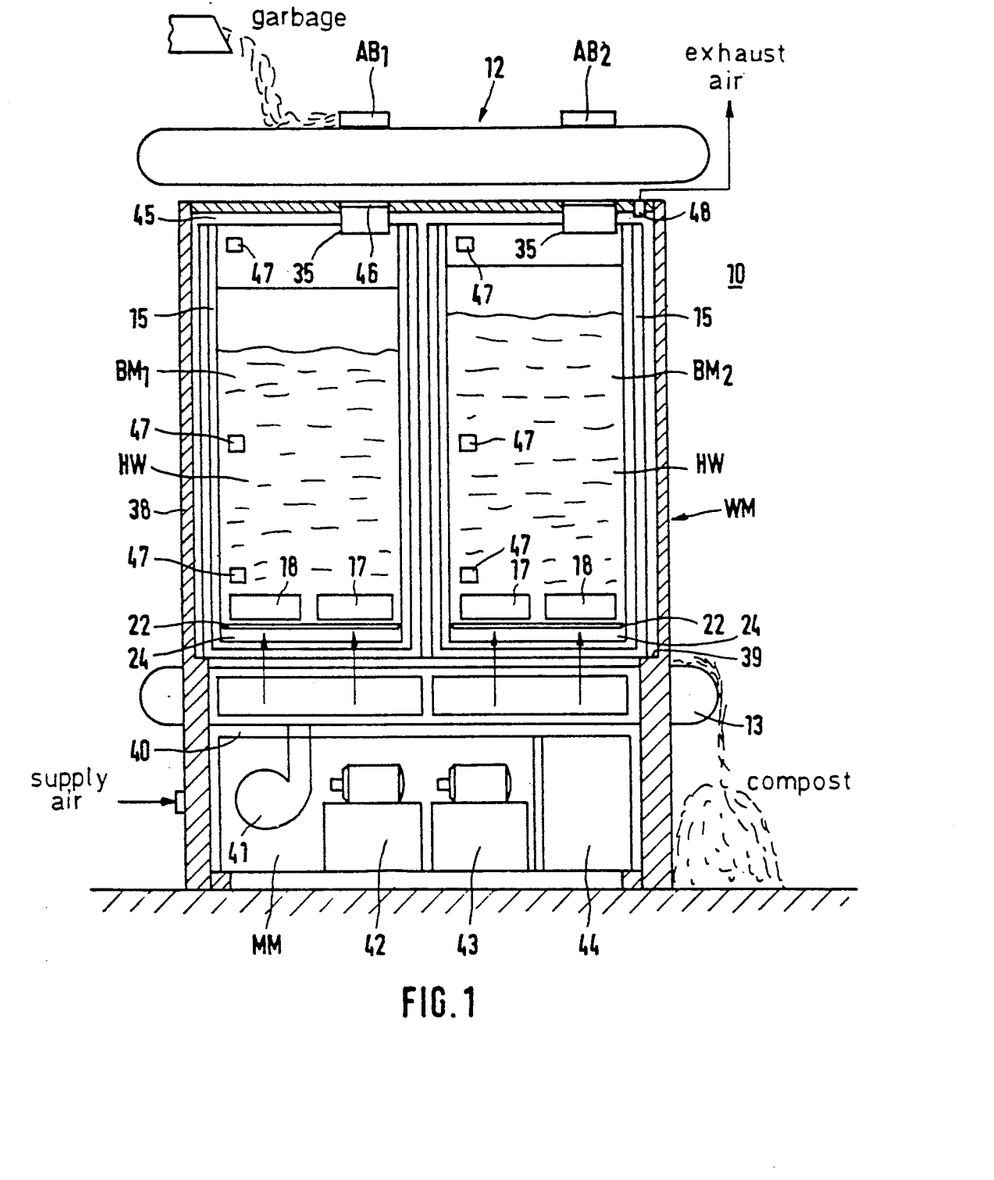
FIG. 1 shows a section through a vessel structure according to the invention.

A vessel structure generally indicated at 10 in FIG. 1 comprises at least two vessel modules BM1 and BM2 which are arranged in position side by side and are positively surrounded by a wall module WM which also at least partially encloses a machine module MM.

The wall module WM is associated with conveyor belts 12 and 13, of which the conveyor belt 12 serves to feed appropriately comminuted and selected garbage or organic wastes, and the conveyor belt 13 serves to remove the microbiologically degraded, rotted material compost discharged from the vessel modules.

For feeding the organic wastes into the individual vessel modules, the conveyor belt 12 is associated in a suitable manner with a number of baffles AB1 to ABn, corresponding to the number of vessel modules.

Figure 2:
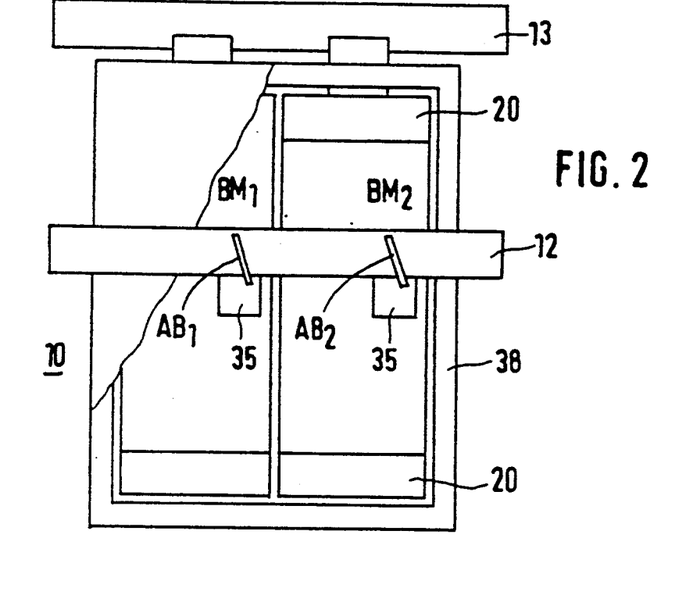
FIG. 2 shows a plan view, represented partially in section, of the vessel structure according to FIG. 1.
Figure 3:
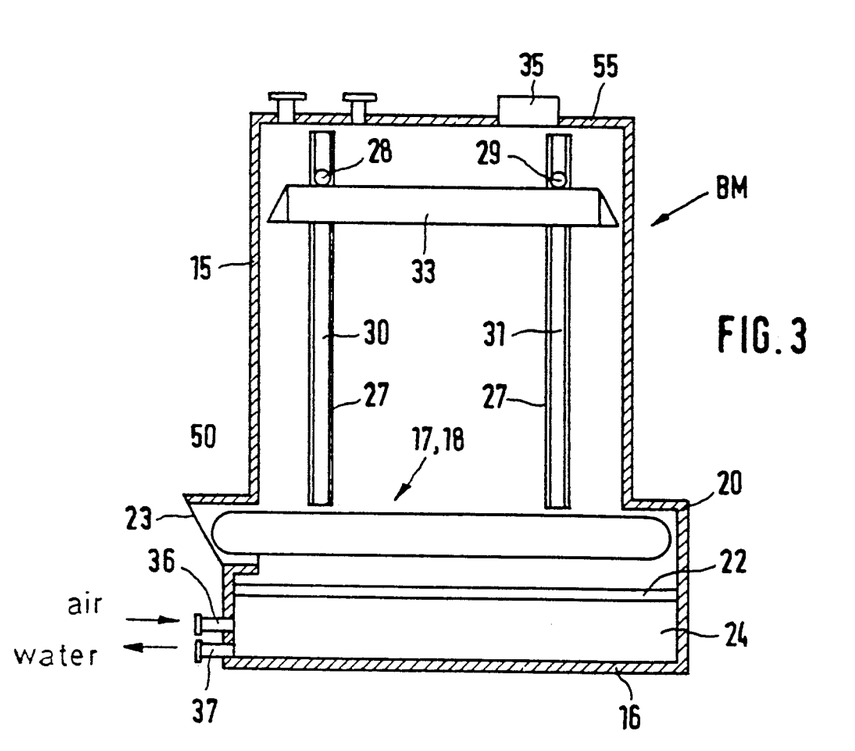
FIG. 3 shows an enlarged representation of a section through a vessel module, viewed as rotated by 90° relative to FIG. 1.
Figure 4:
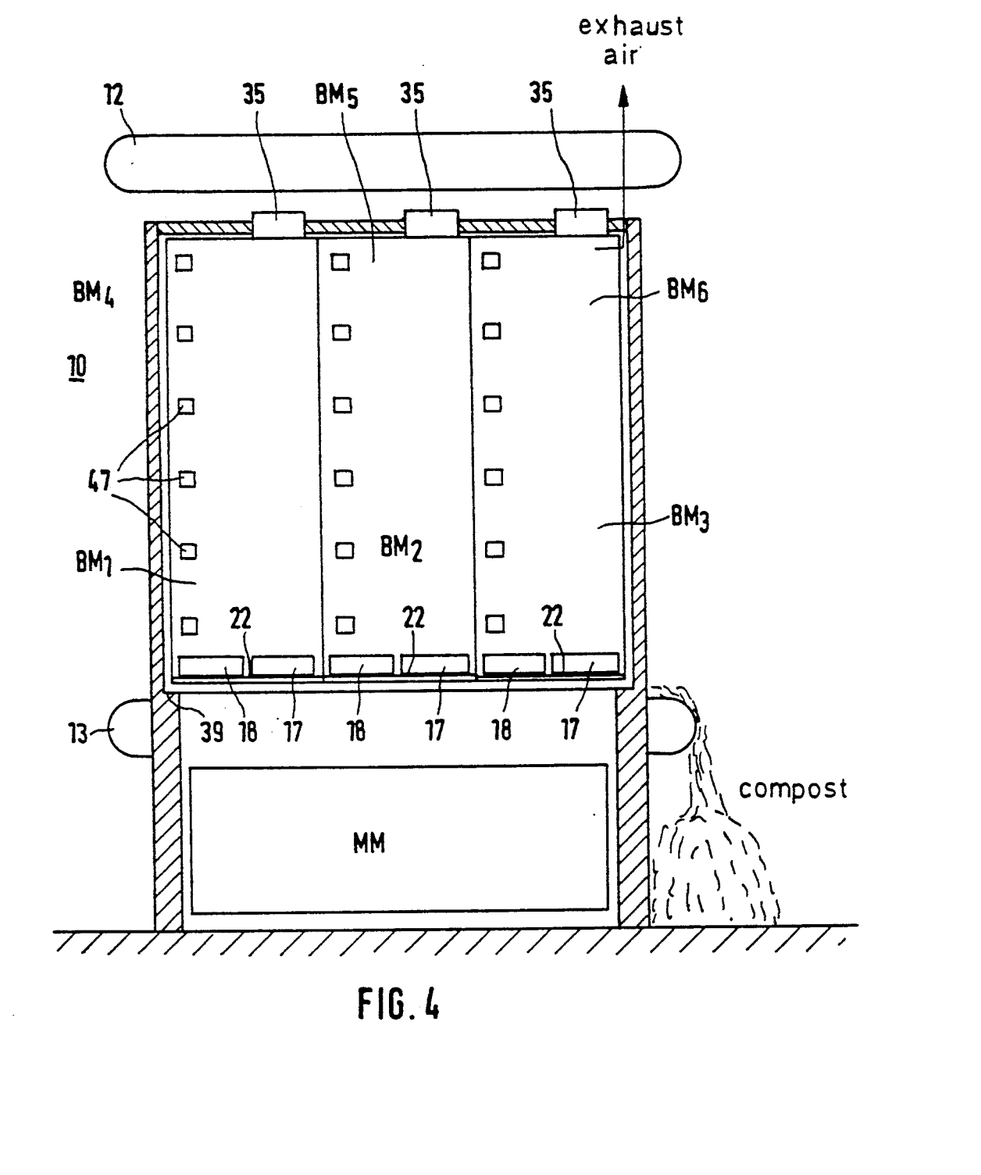
FIG. 4 shows a further embodiment of the arrangement of vessel modules.

Referring to FIG. 3, a vessel module BM will now be described in detail, of which two, three and more vessel modules, as shown in FIG. 2, can be arranged side by side and, as shown by FIG. 4, also on top of one another, depending on the requirements in accordance with the quantities of organic wastes, arising in each case, which are to be degraded microbiologically. In the arrangement according to FIG. 4, the bottom and top walls of the vessel modules BM1/BM4, BM2/BM5 and BM3/BM6, arranged one on top of the other, are omitted and, correspondingly, only one discharge implement and one feed implement are in each case associated with each vessel module group.

In a vessel housing 15 of a four-cornered cross-sectional shape, either square or rectangular, two discharge implements extending over the entire width of the vessel housing are arranged near the bottom 16 in the form of two juxtaposed drag conveyor belts 17 and 18, the bearings and drive connections of which are located outside the wall of the vessel housing 15 and within an attachment 20 at the vessel bottom, the discharge of the degraded wastes taking place via the drag conveyor belts onto the conveyor belt 13 through a cover 21 (see FIG. 7), which can be opened under the control of the machine module.

Figure 7:
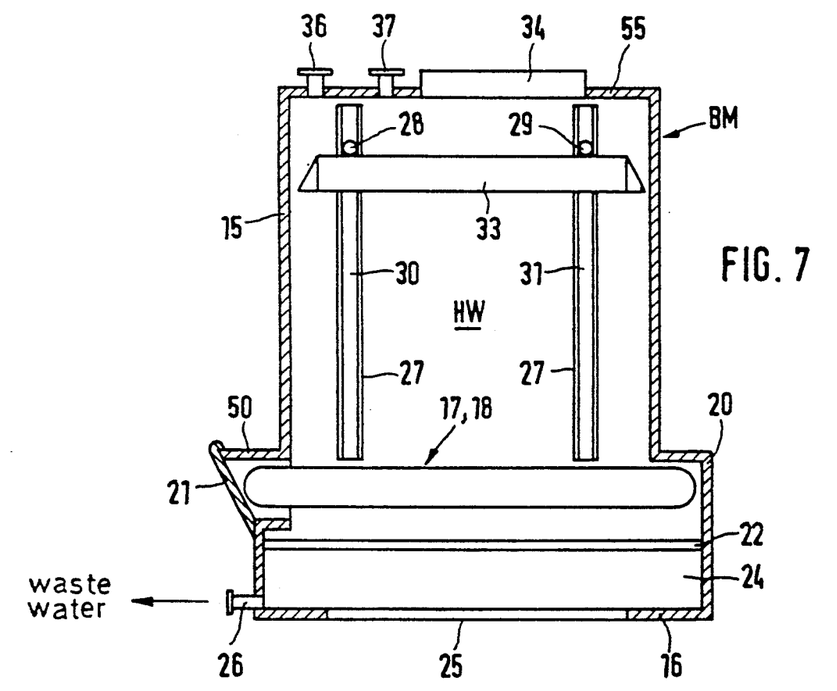
FIG. 7 shows an enlarged representation of a section through a vessel module, viewed as rotated by 90° relative to FIG. 5.

Underneath the drag conveyor belts, a fixed perforated tray 22 is located, on which the particular heap HW is supported. Reference is made to FIG. 7. Underneath the perforated tray, there is an air box 24 which has a connection branch 25 for the air, which is to be fed in and serves for aeration, and a connection branch 26 for withdrawing seepage water and the like.

Inside the vessel housing 15, pulling spindles 28 and 29 are mounted to be movable up and down on four guide rails 27 arranged in uniform distribution, the up-and-down movement being likewise effected by means of pulling spindles 30 and 31. To each of the pulling spindles 28 and 29, a raking share 33 is fixed, by means of which the organic wastes, introduced via a closable opening 34 in the cover of the vessel housing 15, are uniformly distributed over the entire cross-section of the vessel module.

The raking share 33 and the drag conveyor belts 17, 18 are arranged to act at right angles to one another, compare especially FIGS. 1 and 3.

Finally, the connection branches 36 and 37 for discharging the waste air and for feeding water for any spraying of the heap are provided on the cover of each vessel module.

By reference to FIG. 1, the wall module WM will now be described, which consists of a heat-insulated wall 38 which is fixed in position and which has, near to the lower end, a continuous bearing support 39 for supporting the vessel modules BM. Underneath the bearing supports 39, there is a machine room 40 for accommodating the machine module MM, with which the aeration units 41, the drive units 42, the pump units 43 and the regulating and control units 44 are associated.

If two such vessel modules are stacked, these modules are designed to be stackable in an air-and-water-tight manner, each vessel module combination having only one perforated tray 22, one discharge implement 17/18 and one charging opening 35 and one raking share 33, as already mentioned.

Via connection branches which are not shown, the corresponding connection branches of the vessel modules are interactively connected to the machine module with respect to the necessary air lines, water lines and instrument lines. The wall module is likewise closed at the top by a cover 45, in which closable openings 46 for feeding the organic wastes into the vessel modules and the connection branches 48 for discharging the exhaust or waste air, for example via suitable filters, which are not shown here, are provided. Due to the rectangular design of the wall module and vessel modules, these positively bear against each other, as is shown especially in FIGS. 1 and 2, by their longitudinal walls and by their attachments on the mutually facing inner and outer surfaces.

The mode of action of the arrangement with two vessel modules, as described, is as follows.

After the first vessel module BM1 has been charged, the microbiological degradation can take place in this vessel module. During this time, the second vessel module BM2 can be charged up. After both vessel modules have been charged up, the heap HW present in the particular vessel modules is alternately aerated discontinuously, the aeration being effected via the particular air box 24 in surges interrupted by pauses which are of such a length that the temperature is the same in all layers of the heap, and the oxygen in the waste air does not fall below 10% by volume. The pauses are controlled in length by means of the regulating and control instruments 44, utilizing measuring sensors 47 associated with each of the vessel modules. Thus, the air surge must be sized in such a way that initially there is an excess of available oxygen in all the layers of the heap, which excess cannot immediately be converted by respiration. Within a short time, for example one minute, all the spent air in all layers of the heap must have been replaced by fresh air, which is detectable by a sudden increase in the oxygen content of the waste air. At this moment, an aeration pause is initiated by the control instrument, which pause lasts until the oxygen content of the air present in the heap has fallen to the tolerance limit of 10% $O_2$ content by volume. If the moisture content falls below a lower limit due to the air being drawn through, the topmost layer of the heap is remoistened by spraying in order to prevent drying-out of the heap. Any seepage water formed is drawn off via the connection branches 26. For correct sizing of the aeration pauses at all times, a so-called oxygen recorder for $O_2$ content in the waste gas stream and a temperature recorder with at least three measuring points located at different layer heights in the heap can be used. A $CO_2$ recorder can also be used in place of an $O_2$ recorder. Of course, innoculation material, for example in the form of microcultures, freshly discharged degraded material and the like, can also be added to the heap.

When the desired degree of degradation has been reached, the rotten heap is discharged from the particular vessel module. For the discharge of the rotten heap from the corresponding vessel module, the associated discharge implements 17 or 18 are actuated by the machine module, which implements discharge of the microbiologically degraded heap onto the conveyor belt 13 of the wall module, so that it is moved to the outside to a suitable storage place (See FIG. 1). The emptied vessel module is then recharged via the conveyor belt 12, and the organic wastes fed in are uniformly distributed over the cross-section of the vessel module by the raking share 33 which has been moved into the vicinity of the bottom. The raking share is moved upwards together with the rising heap in relation to FIG. 3 by the pulling spindles 30, 31. After the vessel module has been charged, the heap present therein is likewise aerated in the manner described.

As can be seen from the above, the microbiological degradation of the organic wastes takes place in optimized suitable charge sizes which allow the use of reliably operating mechanical feed and discharge implements, so that a rotting arrangement which functions in reliable operation for any desired length of operating periods is obtained for the first time.

Figure 5:
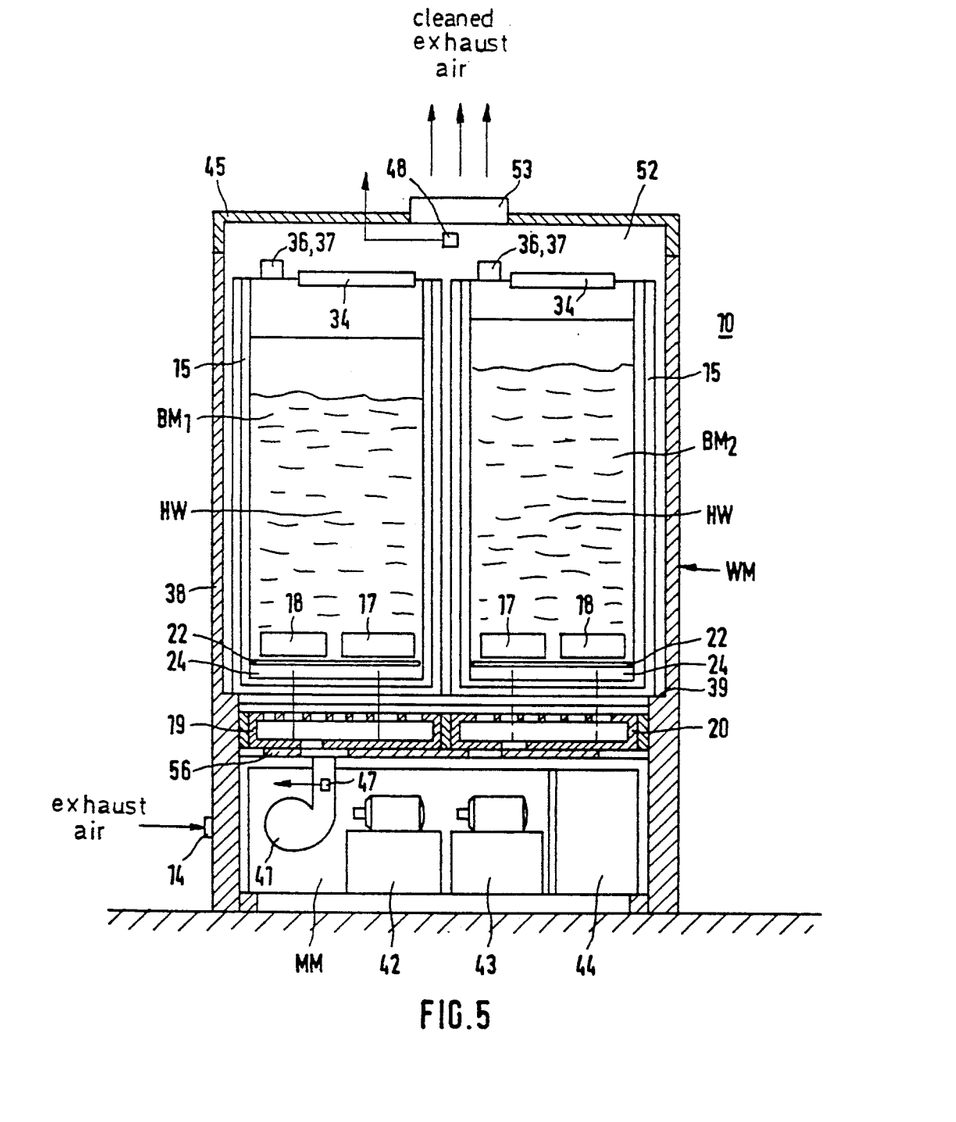
FIG. 5 shows a section through a vessel structure of the biofilter according to the invention.

A modification is now described which serves for waste gas purification. In FIG. 5, the vessel 10 forms a biofilter BF and comprises at least two vessel modules BM1 and BM2 (filter units I and II) which are arranged in positions side by side and which are positively surrounded by a heat-insulated wall module WM which also at least partially comprises a machine module MM.

In the upper region of the wall module WM, an air dome 52 is provided which has an outlet 53 through which the cleaned or purified exhaust or waste air escapes. In the vessel modules there is a biomass which in each case rests on a perforated tray 22. The pollutant-laden exhaust or waste air fed into biofilter 10 at opening 14, enters one or the other vessel modules depending on the vessel module activated at the time and, after purification, enters the air dome of the wall module and leaves from there via the outlet from the filter. For changing over, a slide 56, known per se, in the lower region of the wall module is used, via which slide the air boxes 19 and 23 having the inlet and outlet openings shown are aerated alternately.

The biomass is introduced into the individual vessel modules in the conventional manner, for example by means of conveyor belts (not shown) or by means of feed implements arranged in the vessel. In such a case, the vessel modules contain drag conveyor belts 17 and 18 as well as feed implements, which will be described later, above the perforated trays.

Figure 6:
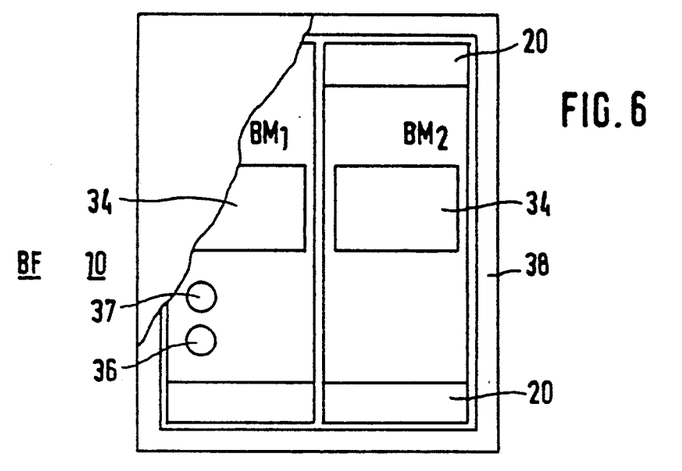
FIG. 6 shows a plan view, partially in section, of the vessel structure according to FIG. 5.

In FIG. 7, a vessel module BM is described in detail, of which two, as FIG. 6 shows, or also three and more vessel modules can be provided side by side, depending on the requirements in accordance with the rates, arising at the time, of waste air pollutants which have to be microbiologically degraded.

In the interior of a vessel housing 15 made with a four-cornered cross-section, either square or also rectangular, discharge implements extending across the entire width of the vessel housing are arranged near the bottom 16 in the form of two juxtaposed drag conveyor belts 17 and 18, the bearings and drive connections of which are located outside the wall of the vessel housing 15 and inside an attachment 50 at the vessel bottom, the spent biomass being discharged by means of the drag conveyor belts via a cover 21 which is hinged in front of the attachment 50 and which can be opened under control by the machine module.

Underneath the drag conveyor belts, the previously described fixed perforated tray 22, is arranged on which the particular biomass is supported as a heap HW. Underneath the perforated tray, there is a free space 24, connection openings 25 for the pollutant-laden waste air to be fed, and a connection branch 26 for the withdrawal of seepage water and the like leading into this free space.

Within the vessel housing 15, pulling spindles 28 and 29 are mounted to be movable up and down on four guide rails 27 in uniform distribution, the up-and-down movement being likewise effected by pulling spindles 30 and 31. To each of the pulling spindles 28 and 29, a raking share 33 is fixed, by means of which the biomass introduced via a closable opening 34 in the cover 55 of the vessel housing 15 can be uniformly distributed over the entire cross-section of the vessel module.

The raking share 33 and the drag conveyor belts 17, 18 are arranged to act at right angles to one another, referring to FIGS. 5 and 7.

As mentioned above, the provision of raking shares and drag conveyor belts can be omitted, without the filter process according to the invention becoming impractical.

Finally, in both embodiments, connection branches 36 and 37 for the exit of the purified waste air and for feeding of water for any necessary spraying of the heap are provided in the cover 55 of each vessel module.

The wall module WM shown in FIG. 5 is similar in many respects to the wall module of FIG. 1, consisting of a heat-insulated wall 38 in a fixed position and formed with a bearing support 39 all round near the lower end for supporting the vessel modules BM. Underneath the bearing supports 39, there is a machine room 40 in which is positioned a unit 41 for generating the delivery pressure for the pollutant-laden waste air, a drive unit 42 for the feed and discharge implements, pump units 43, and regulating and control units 44 which, inter alia, also activate the slide 56.

The corresponding connection branches of the vessel modules are interactively connected to the machine module with respect to the required air, water and instrument lines via connection branches which are not shown. The wall module is likewise closed at the top by a cover 45 which can be tilted open or taken off and which confines the air dome 52, already mentioned, above the vessel modules and which has the connection for discharging the purified waste air. Due to the rectangular design of wall module and vessel modules, these positively bear against each other, as shown especially by FIGS. 1 and 2, by their longitudinal walls and by their attachments at the mutually facing inner and outer surfaces.

The connection branch 14 is associated with an oxygen-measuring instrument, and the air dome is associated with a measuring instrument, for example a so-called FID, well known per se and forming no part of the present invention, by means of which the organic C content in the waste air leaving the arrangement can be determined. In FIG. 5, only the measuring sensors 47 and 49 of these measuring instruments are shown.

The mode of action of the arrangement described, with two vessel modules of any of the embodiments, is as follows.

After the vessel modules BM1 and BM2 are charged up, with their biomasses inserted, the waste air which is to be purified can be controllably fed to the vessel module BM1 by the control module 44 until the biomass, that is to say the adsorbent, has been saturated. This is determined by measuring the organic C content in the waste air leaving the filter device by means of an FID measuring instrument which is connected to the measuring sensor 49. As soon as a preset limit of organic carbon content in the waste air is exceeded, the control module 44 changes the waste gas feed over from filter unit I to filter unit II. This limit may be set by legal regulations and, in the Federal Republic of Germany, this is 50 mg/m$^3$ in accordance with "TA-Luft [Clean Air Regulations]".

After a time period determined on the basis of empirical tests, which is required by the microorganisms for the "conversion by respiration", that is to say the time for degradation of the pollutants, which time period is stored in the control module, the filter unit I is again available for feeding of waste air. During this time, the waste air to be purified is charged to the second vessel module BM2 until the change-over described again takes place. During the feed pauses, the microorganisms colonizing the biomass of the vessel modules BM1 and BM2 have time in each case for digesting the pollutants absorbed in them.

After expiration of the aeration time, which has to be determined by instrument engineering, the control module 44 changes the feed of waste air from vessel module BM2 over to vessel module BM1, and vice versa, so that the microorganisms colonizing the biomass of the particular vessel module can microbiologically digest the pollutants absorbed therein. The two vessel modules are thus discontinuously aerated in a predetermined cycle, the aeration being effected via the particular air box 24 in surges interrupted by predetermined pauses. The pauses have a length in accordance with empirical values as a function of the rate of waste air and the pollutants to be processed, and are determined by the regulating and control devices 44 utilizing the measuring sensors 47, 49. Care is here also taken in particular to ensure that the O$_2$ content in the waste air fed in does not fall below 12% by volume; if necessary, atmospheric air must then be added to the waste gases fed. The measurement of the moisture content is likewise carried out in a manner known per se by means of a measuring sensor which is not shown. If the moisture content in the heap falls below a lower limit, the topmost layer of the heap can be remoistened by spraying in order to prevent drying-out of the heap. Any seepage water formed is extracted in each case via one of the connection branches 26.

Recorders well known per se can be used for recording the C content and O$_2$ content in the waste gas stream and can be used for recording the particular correct dimensioning of the aeration pauses.

When the degradation capacity of the microorganisms in the biomass is finally exhausted, the heap is discharged from the particular vessel module. In the simplest case, this is done in such a way that, for example, the vessel modules are taken out of the wall module by means of a travelling crane trolley or lifting tackle, after the cover 45 has been tilted open. The modules are emptied in the usual manner, newly charged and moved back again.

However, for discharging the spent heap from the vessel module concerned, the associated discharge implements 17 or 18, which discharge the degraded heap via the opening 23 (FIG. 3) and which can also be actuated via the machine module. The emptied vessel module can then be charged anew via the opening 34, for example, by means of a conveyor belt not shown, the biomass fed in is uniformly distributed over the cross-section of the vessel module by the raking share 33 moved into the vicinity of the bottom. With the heap rising in relation to FIG. 7, the raking share is moved upwards by the pulling spindles 30, 31. After the vessel modules have been charged up, pollutant-laden waste air can again be fed in the manner described.

As can be seen from the above, the microbiological degradation of the organic pollutants arising takes place according to the invention within suitable charge sizes and discontinuously within predetermined periods, so that the microorganisms colonizing the biomass are allowed sufficient time for the microbial degradation of the pollutants. In this way, a biofilter arrangement which operates continuously and functions reliably for any desired length of operating period has been provided for the first time.

What is claimed is:

1. An apparatus for the microbiological degradation of a biomass of solid organic waste, comprising:
    a vessel containing at least two part vessels positioned side by side, each part vessel containing a portion of said biomass;
    a perforated support tray for supporting the biomass;
    a gas feed means located below the tray for passing a gaseous medium containing oxygen through the tray and into the biomass within each part vessel, the gas feed means alternately feeding the gaseous medium to each of the part vessels for a preselected time; and
    a conveying means for conveying treated biomass from each part vessel, the conveying means being located above the perforated tray.

2. An apparatus as claimed in claim 1, wherein the biomass in each part vessel is supplied with a gaseous medium by an air blower which is controllable independently of the other air blowers.

3. An apparatus as claimed in claim 1, further including a main air blower, and an air diverting device positioned between aid main air blower and said part vessels for selective control of the air feed to each part vessel.

4. An apparatus as claimed in claim 1, wherein the at least two part vessels are designed as vessel modules, each being provided with mechanical feed and discharge elements.

5. An apparatus as claimed in claim 4, wherein said feed implements include skimming shares, said shares being mounted in each vessel module for vertical positioning and further mounted for reciprocal movement within each vessel module.

6. An apparatus as claimed in claim 4, wherein aid discharge implements are drag conveyor belts, each located above the respective perforated tray.

7. An apparatus as claimed in claim 4, wherein said feed and discharge implements are arranged at right angles to each other.

8. An apparatus as claimed in claim 4, wherein said vessel modules are stackable in an air- and water-tight manner, each vessel module combination having a single perforated tray and one discharge implement, and wherein the height of the wall module corresponds to the height of the vessel module combination.

9. An apparatus as claimed in claim 4, wherein said vessel modules each have a four-cornered cross-section, in order to facilitate their vertical and horizontal stacking within a wall module.

10. An apparatus as claimed in claim 4, wherein said part vessels comprise vessel modules of the same size and cross-section for arrangement in positions side by side within a wall module, said vessel modules being connected alternately by a slide to a common gas pressure source, the position of said slide determining which of the modules will alternately receive gas from the pressure source.

11. An apparatus as claimed in claim 4, wherein the wall module contains measuring sensors for determining the $O_2$ content of the gases fed into the apparatus and the organic C content of the waste air.

12. The apparatus of claim 1, wherein said biomass adsorbs organic impurities contained in said gaseous medium, the apparatus further comprising means for selecting the time between the gassing periods of the vessels.

13. The apparatus of claim 1, further comprising means for determining the organic carbon content in the waste gaseous medium leaving the part vessels.

14. The apparatus of claim 1, further comprising means for monitoring the oxygen content of the gases fed to the part vessels.

15. The apparatus of claim 14, further comprising means for maintaining the oxygen content of the gas fed in at about 12% per volume.

16. The apparatus of claim 1, further including biomass conveying means for supplying each part vessel with biomass, the biomass being supplied through an upper end of each part vessel.

17. An apparatus for the microbiological degradation of solid organic waste, comprising:
    a vessel, which, as a support surface for a biomass of solid organic waste, contains a perforated tray, said vessel being divided into at least two part vessels, each part vessel containing a portion of aid biomass, gas feed means for alternately feeding a gaseous medium through said tray to each of the part vessels for a preselected time, means for determining the organic carbon content of the wasted gaseous medium leaving the vessels, and means for monitoring and maintaining the oxygen content of the gaseous medium fed in at a predetermined value of approximately 12% by volume.

* * * * *